United States Patent
Tanaka

(10) Patent No.: US 7,055,501 B2
(45) Date of Patent: Jun. 6, 2006

(54) IGNITION TIMING CONTROL METHOD AND APPARATUS FOR INTERNAL COMBUSTION ENGINE

(75) Inventor: Hiroshi Tanaka, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/200,033

(22) Filed: Aug. 10, 2005

(65) Prior Publication Data

US 2006/0037583 A1   Feb. 23, 2006

(30) Foreign Application Priority Data

Aug. 23, 2004  (JP) ............................. 2004-242787

(51) Int. Cl.
*F02D 43/00*   (2006.01)
(52) U.S. Cl. .................................. 123/406.47; 123/431
(58) Field of Classification Search ........... 123/406.47, 123/431, 339.1, 339.11, 305; 701/103, 104, 701/105, 106
See application file for complete search history.

(56) References Cited

U.S. PATENT DOCUMENTS 6,314,940 B1   11/2001 Frey et al.
6,981,487 B1 *  2/2006 Ohtani ................... 123/406.37
2006/0037581 A1 *  2/2006 Miyashita et al. ........... 123/305

FOREIGN PATENT DOCUMENTS

| EP | 0 892 161 A | 1/1999 |
|---|---|---|
| EP | 0 943 793 A | 9/1999 |
| EP | 1 229 235 A | 8/2002 |
| EP | 1 267 070 A | 12/2002 |
| EP | 1 277 942 A | 1/2003 |
| EP | 1 561 936 A | 8/2005 |
| JP | 2001-020837 A | 1/2001 |
| JP | 2002-227697 A | 8/2002 |

* cited by examiner

*Primary Examiner*—Andrew M. Dolinar
*Assistant Examiner*—Johnny H. Hoang
(74) *Attorney, Agent, or Firm*—Oliff & Berridge, PLC

(57) ABSTRACT

For an internal combustion engine including an in-cylinder injector and an intake port injector, when a request to change a fuel injection ratio to a requested fuel injection ratio is made and a difference between a proper ignition timing value corresponding to the fuel injection ratio before the change and a proper ignition timing value corresponding to the requested fuel injection ratio after the change exceeds a predetermined value, a magnitude of the change of the fuel injection ratio to the requested fuel injection ratio is limited and the ignition timing value is set to an ignition timing value corresponding to a fuel injection ratio changed by the limited magnitude of change.

10 Claims, 10 Drawing Sheets

F I G. 5
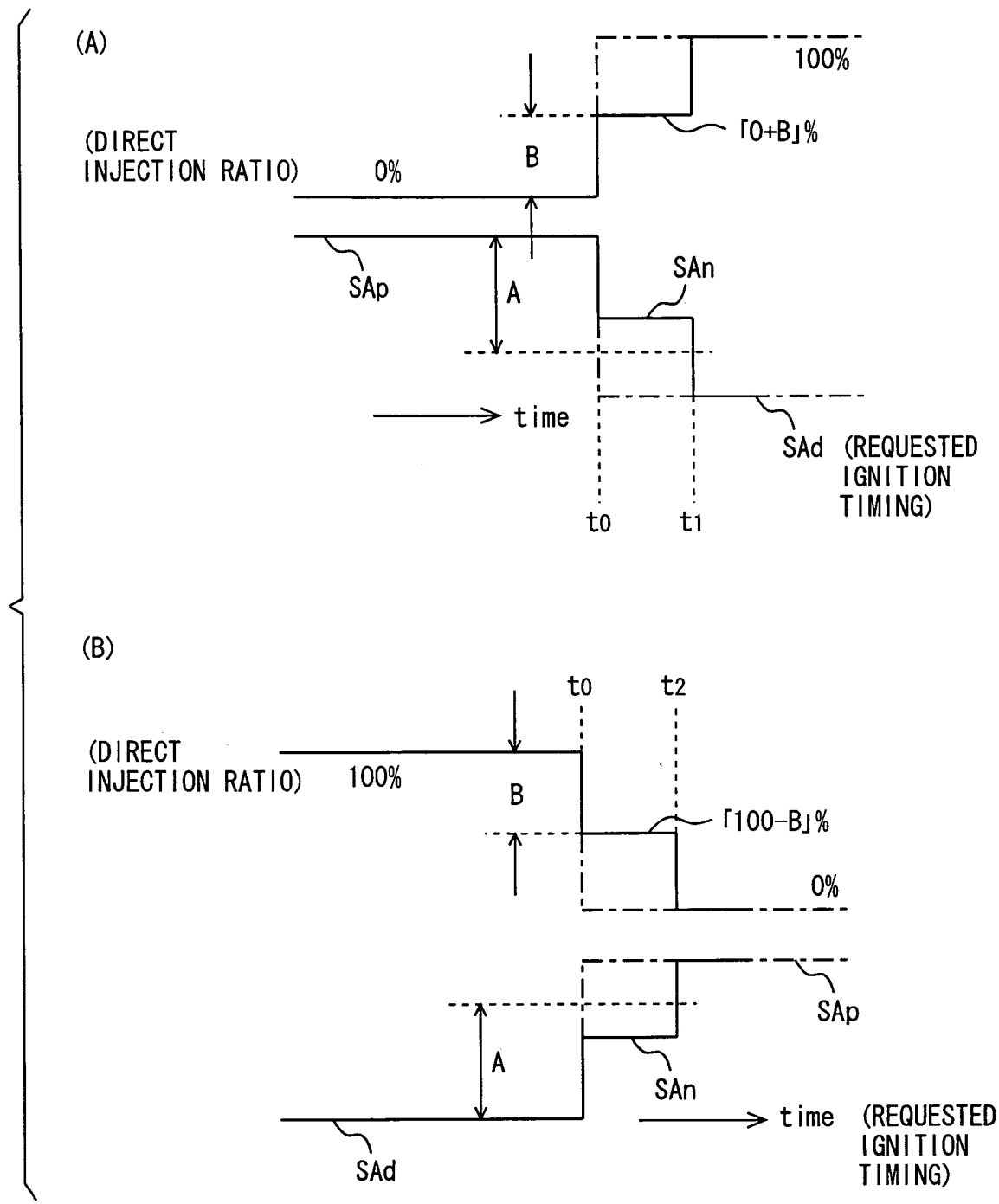

F I G. 7
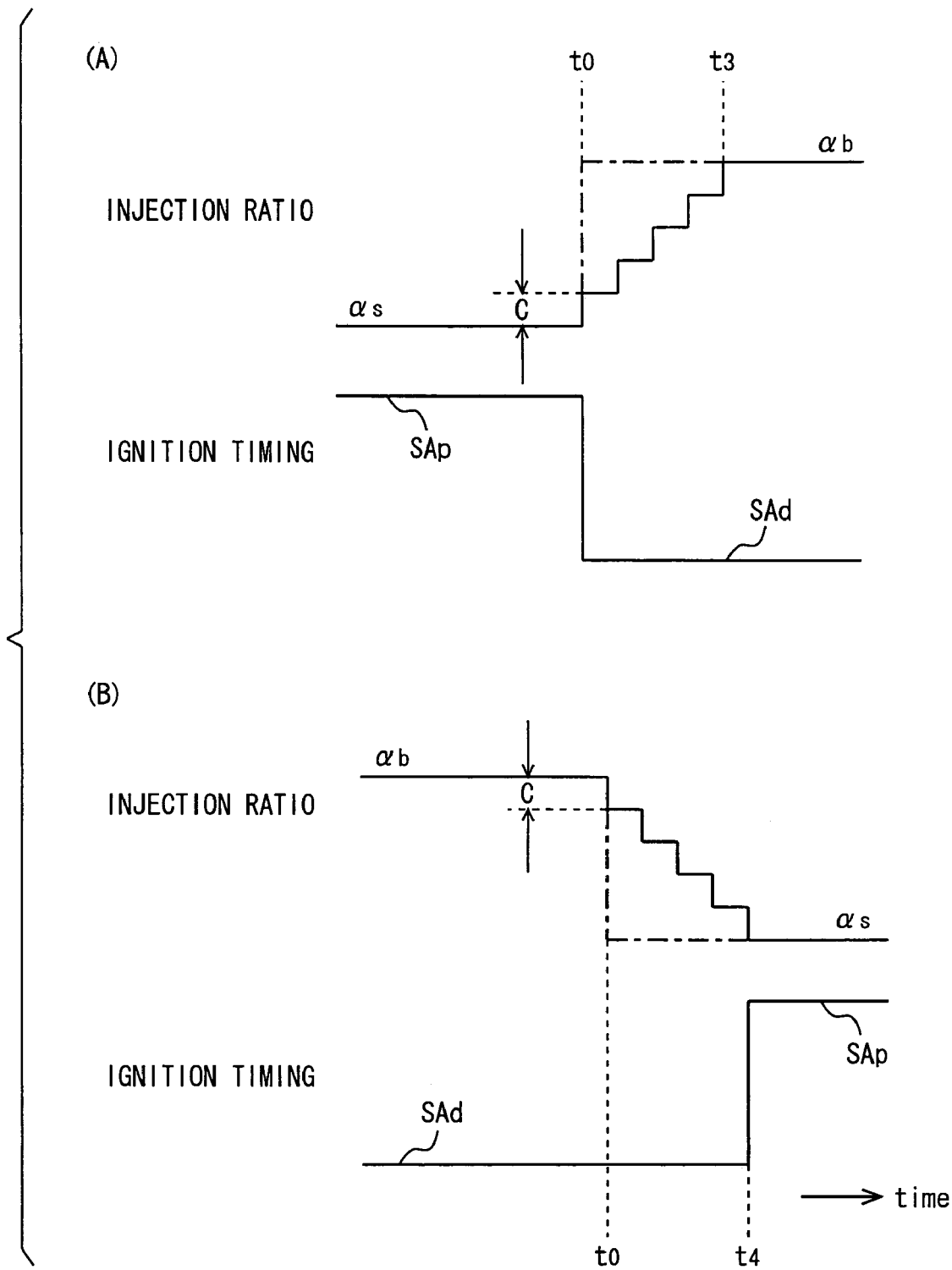

IGNITION TIMING CONTROL METHOD AND APPARATUS FOR INTERNAL COMBUSTION ENGINE

This nonprovisional application is based on Japanese Patent Application No. 2004-242787 filed with the Japan Patent Office on Aug. 23, 2004, the entire contents of which are hereby incorporated by reference.

BACKGROUND OF THE INVENTION

1. Field of the Invention

The present invention relates to an ignition timing control method and an ignition timing control apparatus for an internal combustion engine, and particularly to an ignition timing control method and an ignition timing control apparatus for an internal combustion engine of so-called dual injection type that includes an in-cylinder injector for injecting a fuel into a cylinder and an intake port injector for injecting a fuel into an intake manifold or intake port.

2. Description of the Background Art

An internal combustion engine of so-called dual injection type is known from Japanese Patent Laying-Open No. 2001-020837. This internal combustion engine includes an in-cylinder injector for injecting a fuel into a cylinder and an intake port injector for injecting a fuel into an intake manifold or intake port. According to an operation state, switching is made between these injectors for use to achieve for example stratified charge combustion in a low-load operation region and homogeneous combustion in a high-load operation region, or these injectors are simultaneously used while the fuel injection ratio between the injectors is changed to achieve homogeneous lean combustion and homogeneous stoichiometric combustion, thereby improving fuel economy characteristics and output characteristics.

Generally, for an internal combustion engine of the fuel injection type, in order to allow proper combustion to occur according to an operation state, a final ignition timing is determined by adding various corrective advance (or retard) values according to an engine state to a basic ignition timing value that is set in advance in association with the operation state and stored for example in a map. Ignition is caused to occur based on the determined final ignition timing for operation.

Regarding the aforementioned dual-injection-type internal combustion engine, because of the difference in injection manner, namely depending on whether the injection manner is the one in which the fuel is injected from the in-cylinder injector or the one in which the fuel is injected from the intake port injector, the temperature of an air-fuel mixture and the state of mixture of the fuel in a combustion chamber could vary. A resultant problem is that, if ignition is simply caused for operation based on an ignition timing value that is set according to an operation state, the ignition timing is improper.

For example, when the fuel is injected from the in-cylinder injector, it is likely that the fuel distribution in the combustion chamber is uneven as compared with the case where the fuel is injected from the intake port injector. If the air-fuel mixture is ignited in the state where the fuel distribution is uneven, combustion proceeds rapidly in a high-fuel-concentration portion and thus the combustion rate of the air-fuel mixture tends to be high. Thus, since the combustion rate of the air-fuel mixture varies depending on whether the fuel injection manner is the fuel injection by the in-cylinder injector or the fuel injection by the intake port cylinder, the ignition timing has to be set appropriately. Otherwise, such abnormal combustion as knocking occurs or the output power (torque) is insufficient.

Further, when the operation is in a transitional state, specifically, when the injection manner is switched from the injection by the in-cylinder injector or from the injection by the intake port injector or the injection ratio between these injectors is changed, the change in injection manner or injection ratio could result in a different port wall temperature and a different inner-cylinder-wall temperature as well as a different amount of fuel sticking to the port wall, the inner cylinder wall and the top wall of the piston as compared with those in a normal state. Accordingly, the temperature of the air-fuel mixture and the air/fuel ratio in the combustion chamber could be over-rich or over-lean. In such a state, if the ignition timing is set to the one determined in a stable state, knocking due to excessive advance or insufficient output power (torque) due to excessive retard for example could occur because of the ignition timing that is different from a proper value, resulting in torque variations.

SUMMARY OF THE INVENTION

In view of the aforementioned conventional problems, an object of the present invention is to provide an ignition timing control method and an ignition timing control apparatus for an internal combustion engine that includes an in-cylinder injector and an intake port injector, reducing the possibilities for example of occurrence of knocking due to excessive advance and torque variations caused by insufficient output power due to excessive retard in a transitional state.

According to an aspect of the present invention to achieve the object above, an ignition timing control method for an internal combustion engine including an in-cylinder injector and an intake port injector is characterized in that, when a request to change a fuel injection ratio to a requested fuel injection ratio is made and a difference between a proper ignition timing value corresponding to the fuel injection ratio before the change and a proper ignition timing value corresponding to the requested fuel injection ratio after the change exceeds a predetermined value, a magnitude of the change of the fuel injection ratio to the requested fuel injection ratio is limited and the ignition timing value is set to an ignition timing value corresponding to a fuel injection ratio changed by the limited magnitude of change.

According to another aspect of the present invention to achieve the object above, an ignition timing control method for an internal combustion engine including an in-cylinder injector and an intake port injector is characterized in that, when a request to change a fuel injection ratio to a requested fuel injection ratio is made and a difference between the fuel injection ratio before the change and the requested fuel injection ratio after the change exceeds a predetermined value, the fuel injection ratio is changed step-by-step for reaching the requested fuel injection ratio and, timing of change of an ignition timing is varied with respect to the step-by-step change of the fuel injection ratio.

Preferably, the timing of change of the ignition timing is prior to the step-by-step change of the fuel injection ratio when the ignition timing is changed to be retarded and, the timing of change of the ignition timing is delayed with respect to the step-by-step change of the fuel injection ratio when the ignition timing is changed to be advanced.

According to still another aspect of the present invention to achieve the object above, an ignition timing control method for an internal combustion engine including an in-cylinder injector and an intake port injector is characterized in that, when a request to change a fuel injection ratio is made and a difference between the fuel injection ratio before the change and a fuel injection ratio after the change exceeds a predetermined value and a proper ignition timing corresponding to the fuel injection ratio after the change is a retarded ignition timing relative to an ignition timing corresponding to the fuel injection ratio before the change, the fuel injection ratio is changed and the ignition timing is temporarily over-retarded and thereafter changed step-by-step to reach the retarded ignition timing.

According to a further aspect of the present invention to achieve the object above, an ignition timing control method for an internal combustion engine including an in-cylinder injector and an intake port injector is characterized in that, when a request to change a fuel injection ratio is made and a difference between the fuel injection ratio before the change and a fuel injection ratio after the change exceeds a predetermined value and a proper ignition timing corresponding to the fuel injection ratio after the change is an advanced ignition timing relative to an ignition timing corresponding to the fuel injection ratio before the change, the fuel injection ratio is changed and the ignition timing is temporarily over-advanced and thereafter changed step-by-step to reach the advanced ignition timing.

According to the ignition timing control method for an internal combustion engine in an aspect of the present invention, for the internal combustion engine including an in-cylinder injector and an intake port injector, when a request to change the fuel injection ratio is made and the difference between a proper ignition timing value corresponding to the fuel injection ratio before the change and a proper ignition timing value corresponding to the one after the change exceeds a predetermined value, the magnitude of change of the fuel injection ratio as requested is limited. Then, the ignition timing value is set to an ignition timing value corresponding to the fuel injection ratio as limited.

It is supposed here that an operation state is changed from an injection manner of the injection from the intake port injector to the one from the in-cylinder injector and accordingly a request to change the fuel injection ratio between the injection from the intake port injector and the injection from the in-cylinder injector is made. Then, if the fuel injection ratio is changed as requested, a part of fuel injected from the intake port injector before the change is supplied additionally into the cylinder, resulting in an over-rich air/fuel ratio relative to a target air/fuel ratio that should be implemented according to the fuel injection ratio after the change. Further, if the ignition timing corresponding to the requested injection ratio is immediately implemented, the timing is over-advance and transitional knock could occur. In contrast, according to the aspect of the present invention, the magnitude of the change of the fuel injection ratio to the requested fuel injection ratio is limited so that the degree of over-rich is suppressed. Further, since the ignition timing value is set to the one corresponding to the injection ratio as limited, transitional knock is effectively prevented.

On the contrary, it is supposed that an operation state is changed from an injection manner of the injection from the in-cylinder injector to the one from the intake port injector and accordingly a request to change the fuel injection ratio between the injection from the in-cylinder injector and the injection from the intake port injector is made. Then, if the fuel injection ratio is changed as requested, a part of fuel injected from the intake port injector and sticking to the port after the change is supplied into the cylinder with some delay, resulting in an over-lean air/fuel ratio relative to a target air/fuel ratio that should be implemented according to the fuel injection ratio after the change. Further, if the ignition timing corresponding to the requested injection ratio is immediately implemented, torque shock due to a decrease in output power could occur. In contrast, according to the aspect of the present invention, the magnitude of the change of the fuel injection ratio to the requested fuel injection ratio is limited so that the degree of over-lean is suppressed. Further, since the ignition timing value is set to the one corresponding to an injection ratio as limited, the decrease in output power is effectively prevented.

According to the ignition timing control method for an internal combustion engine in another aspect of the present invention, for the internal combustion engine including an in-cylinder injector and an intake port injector, when a request to change the fuel injection ratio is made and the difference between the fuel injection ratio before the change and the one after the change exceeds a predetermined value, the fuel injection ratio is changed step-by-step for reaching the requested injection ratio and the timing of change of the ignition timing is varied with respect to the step-by-step change of the fuel injection ratio. As described above, the change in injection ratio is likely to cause temporary over-rich and over-lean relative to a target air/fuel ratio. In contrast, according to this aspect of the invention, the fuel injection ratio is changed step-by-step for reaching the requested injection ratio and the timing of change of the ignition timing is varied with respect to the step-by-step change of the fuel injection ratio. Thus, any abrupt change in air/fuel ratio is suppressed and accordingly transitional knock is suppressed.

Here, in the aspect of the invention, when the ignition timing is changed to be retarded, the timing of change of the ignition timing is prior to the step-by-step change of the fuel injection ratio and, when the ignition timing is changed to be advanced, the timing of change of the ignition timing is delayed with respect to the step-by-step change of the fuel injection ratio. Thus, the ignition timing can always be set to the one on the retard side relative to a proper ignition timing corresponding to each injection ratio and accordingly transitional knock can surely be suppressed.

According to the ignition timing control method for an internal combustion engine in still another aspect of the present invention, for the internal combustion engine including an in-cylinder injector and an intake port injector, when a request to change the fuel injection ratio is made and the difference between the fuel-injection ratio before the change and the one after the change exceeds a predetermined value and a proper ignition timing corresponding to the fuel injection ratio after the change is a retarded ignition timing relative to an ignition timing corresponding to the fuel injection ratio before the change, the fuel injection ratio is changed and the ignition timing is temporarily over-retarded and thereafter changed step-by-step to reach the retarded ignition timing. Thus, transitional knock due to temporary over-rich relative to a target air/fuel ratio that is caused by a change of the injection ratio can be suppressed.

According to the ignition timing control method for an internal combustion engine in a further aspect of the present invention, for the internal combustion engine including an in-cylinder injector and an intake port injector, when a request to change the fuel injection ratio is made and the difference between the fuel injection ratio before the change and the one after the change exceeds a predetermined value and a proper ignition timing corresponding to the fuel injection ratio after the change is an advanced ignition timing relative to an ignition timing corresponding to the fuel injection ratio before the change, the fuel injection ratio is changed and the ignition timing is temporarily over-advanced and thereafter changed step-by-step to reach the advanced ignition timing. Thus, any decrease in torque due to temporary over-lean relative to a target air/fuel ratio that is caused by a change of the injection ratio can be suppressed.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a timing chart showing how the ignition timing is changed under control of the ignition timing when the injection manner is changed, according to the first embodiment of the present invention.

FIG. 7 is a timing chart showing how the ignition timing is changed under control of the ignition timing when the injection manner is changed, according to the second embodiment of the present invention.

DESCRIPTION OF THE PREFERRED EMBODIMENTS

Embodiments of the present invention are hereinafter described with reference to the drawings.

Figure 1:
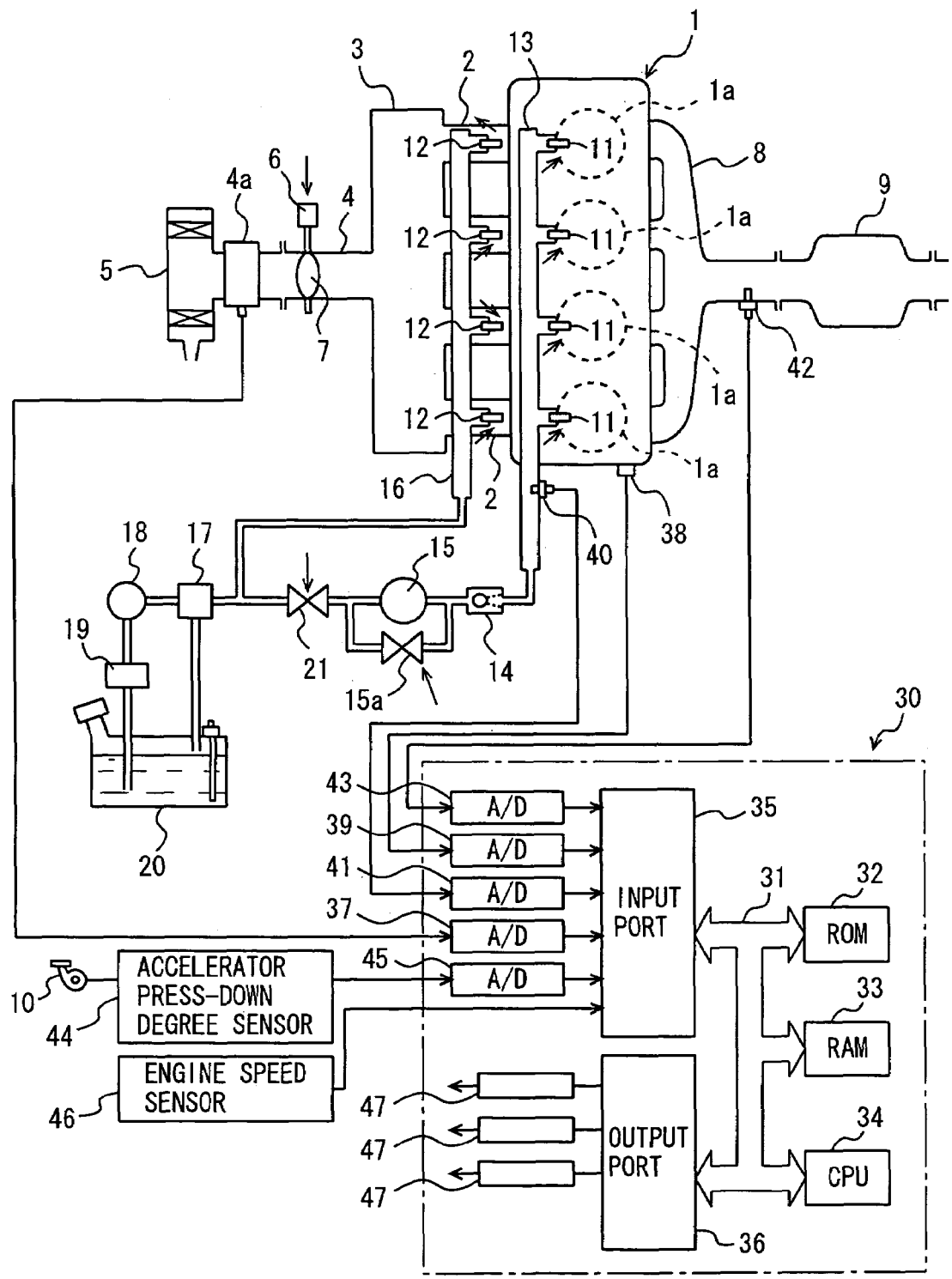
FIG. 1 schematically shows a configuration of a dual-injection-type internal combustion engine to which an ignition timing control method of the present invention is applied.

Referring to FIG. 1 that schematically shows a configuration of a dual-injection-type internal combustion engine having an ignition timing control apparatus mounted thereon to which an ignition timing control method of the present invention is applied, an engine 1 includes four cylinders 1a. Cylinders 1a are connected through corresponding intake manifold branches 2 respectively to a common surge tank 3.

Surge tank 3 is connected through an intake duct 4 to an airflow meter 4a and airflow meter 4a is connected to an air cleaner 5. Within intake duct 4, a throttle valve 7 driven by a DC motor 6 for example is provided. This throttle valve 7 opens/closes intake duct 4 substantially in accordance with press-down of an accelerator pedal 10. Cylinders 1a are connected to a common exhaust manifold 8 and this exhaust manifold 8 is connected to a three-way catalytic converter 9.

To each cylinder 1a, an in-cylinder injector 11 for injecting a fuel into the cylinder as well as an intake port injector 12 for injecting a fuel into an intake port or intake manifold are attached. These injectors 11, 12 are each controlled by an output signal of an electronic control unit 30. In-cylinder injectors 11 are connected to a common fuel delivery pipe 13 and fuel delivery pipe 13 is connected, through a check valve 14 allowing a flow toward fuel delivery pipe 13, to an engine-driven high-pressure fuel pump 15.

As shown in FIG. 1, the discharge side of high-pressure fuel pump 15 is connected through an electromagnetic spill valve 15a to the intake side of high-pressure fuel pump 15. As the degree of opening of this electromagnetic spill valve 15a is smaller, the amount of fuel supplied from high-pressure fuel pump 15 into fuel delivery pipe 13 is increased. When electromagnetic spill valve 15a is fully-opened, the fuel supply from high-pressure fuel pump 15 to fuel delivery pipe 13 is stopped. Here, electromagnetic spill valve 15a is controlled based on an output signal of electric control unit 30.

Intake port injectors 12 are connected to a common fuel delivery pipe 16, and fuel delivery pipe 16 and high-pressure fuel pump 15 are connected through a common fuel pressure regulator 17 to an electric-motor-driven low-pressure fuel pump 18. Further, low-pressure fuel pump 18 is connected through a fuel filter 19 to a fuel tank 20. When the pressure of fuel discharged from low-pressure fuel pump 18 becomes higher than a set fuel pressure that is determined in advance, fuel pressure regulator 17 returns a part of the fuel discharged from low-pressure fuel pump 18 to fuel tank 20. In this way, it is prevented that the pressure of fuel supplied to intake port injector 12 and the pressure of fuel supplied to high-pressure fuel pump 15 become higher than the above-described set fuel pressure. Moreover, as shown in FIG. 1, an open/close valve 21 is provided between high-pressure fuel pump 15 and fuel pressure regulator 17. In a normal state, open/close valve 21 is opened. Open/close valve 21 is closed to stop fuel supply from low-pressure fuel pump 18 to high-pressure fuel pump 15. Opening/closing of open/close valve 21 is controlled based on an output signal of electronic control unit 30.

Figure 2:
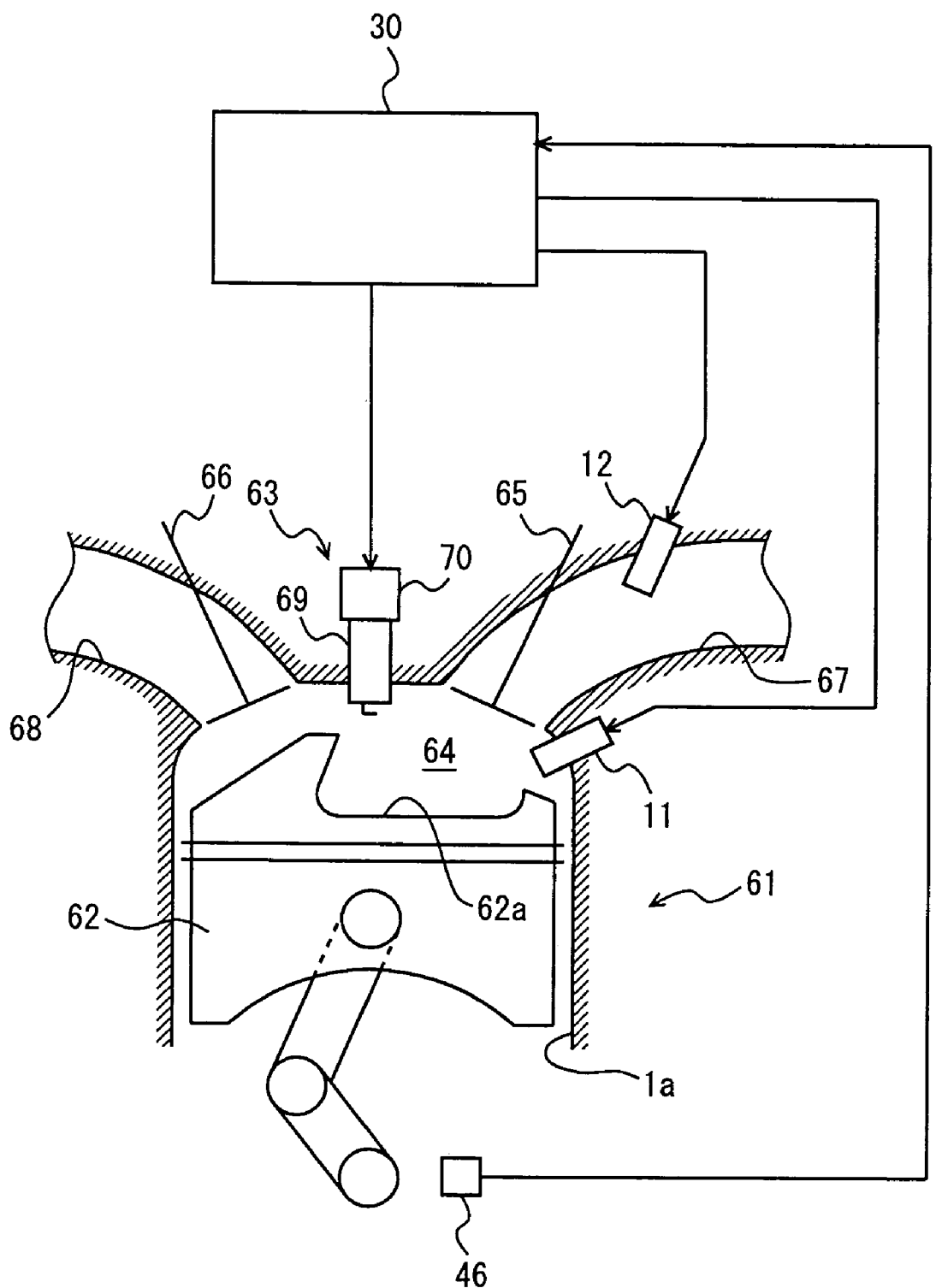
FIG. 2 is a side cross-sectional view of the engine shown in FIG. 1.

FIG. 2 shows a side cross-sectional view of cylinder 1a. Referring to FIG. 2, cylinder 1a includes a cylinder block 61, a piston 62 having its top surface where a concave 62a is formed, a cylinder head 63 secured on cylinder block 61, a combustion chamber 64 formed between piston 62 and cylinder head 63, an intake valve 65, an exhaust valve 66, an intake port 67, an exhaust port 68, a spark plug 69, and an ignitor 70. Intake port 67 is formed to allow air flowing into combustion engine 64 to generate swirls around the cylinder axis. Concave 62a extends from the portion of the periphery of piston 62 where in-cylinder injector 11 is located to the central portion of piston 62 and also extends upward below spark plug 69. Engine speed sensor 46 generates output pulses representing the rotation angle of a crankshaft that is the engine output shaft and accordingly representing the engine speed namely engine rpm.

Electronic control unit 30 is constituted of a digital computer and includes a ROM (read-only memory) 32, a RAM (random-access memory) 33 and a CPU (microprocessor) 34 connected to each other through a bidirectional bus 31 as well as an input port 35 and an output port 36. Airflow meter 4a generates an output voltage proportional to an intake air quantity, and the output voltage of airflow meter 4a is input through an AD converter 37 to input port 35. To engine 1, a water temperature sensor 38 generating an output voltage proportional to an engine coolant temperature is attached, and the output voltage of water temperature sensor 38 is input through an AD converter 39 to input port 35. To fuel delivery pipe 13, a fuel pressure sensor 40 generating an output voltage proportional to the fuel pressure in fuel delivery pipe 13 is attached, and the output voltage of fuel pressure sensor 40 is input through an AD converter 41 to input port 35. To exhaust manifold 8 located upstream of catalytic converter 9, an air/fuel ratio sensor 42 generating an output voltage proportional to the oxygen concentration in a discharge gas is attached, and the output voltage of air/fuel ratio sensor 42 is input through an AD converter 43 to input port 35.

Accelerator pedal 10 is connected to an accelerator press-down degree sensor 44 generating an output voltage proportional to the degree of press down of accelerator pedal 10, and the output voltage of accelerator press-down degree sensor 44 is input through an AD converter 45 to input port 35. To input port 35, engine speed sensor 46 generating an output pulse representing the engine speed is connected. In ROM 32 of electronic control unit 30, a basic fuel injection quantity and a proper ignition timing value described hereinlater that are set in correspondence with an operation state as well as correction values based on the engine coolant temperature for example are mapped and stored in advance based on an engine load factor obtained from accelerator press-down degree sensor 44 or airflow meter 4a and the engine speed obtained from engine speed sensor 46.

Output port 36 of electronic control unit 30 is connected to DC motor 6, in-cylinder injectors 11 each, intake port injectors 12 each, and ignitor 70 of spark plug 69 for example through respective drive circuits 47.

Here, an example of combustion manners associated with operation regions of the engine of the present embodiment is described with reference to FIG. 3. In the present embodiment, under conditions of the operation using, as parameters, the torque and the engine speed (number of revolutions) corresponding to the engine load, there are for example a stratified lean region "1" under a low-speed and low-load operation condition, a homogeneous lean region "2" under a mid-to-high speed and low-to-mid load operation condition and a homogeneous stoichiometric region "3" under a mid-to-high load operation condition. For this stratified lean region "1", stratified lean combustion is caused to occur by direct injection from in-cylinder injector 11 in a compression cycle. For homogeneous lean region "2", the fuel is injected from intake port injector 12 and, as required, a minimum amount of injection for cooling in-cylinder injector 11 is also performed from in-cylinder injector 11 for a high-load region for example. For homogeneous stoichiometric region "3", injection from in-cylinder injector 11 and injection from intake port injector 12 are performed simultaneously at a predetermined injection ratio, with importance given to the output and cooling.

Figure 3:
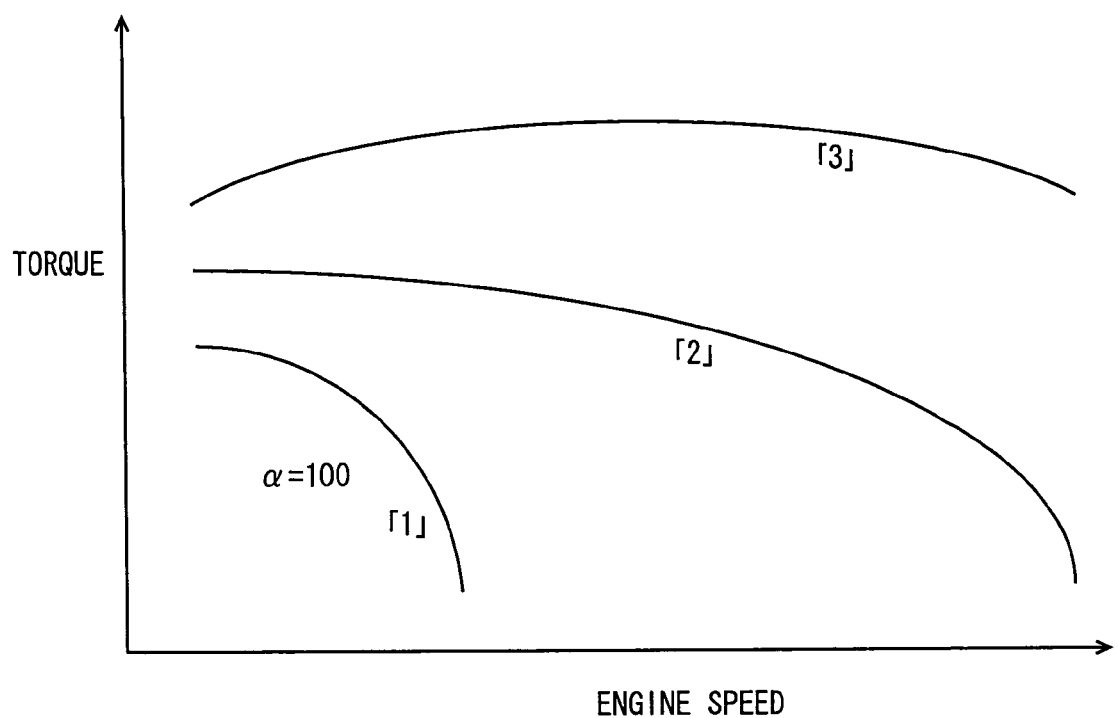
FIG. 3 is a graph showing an example of the relation between a combustion manner that is set according to an operation region or conditions of the engine to which the present invention is applied and a fuel injection ratio between injection from an in-cylinder injector and injection from an intake port injector.

For engine 1 of the present embodiment, a combustion manner or an injection manner is set in correspondence with the operation region or a condition map as shown in FIG. 3 discussed above, and the injection ratio between the injection from in-cylinder injector 11 and the injection from intake port injector 12 is determined. Here, injection ratio $\alpha$ of in-cylinder injector 11 refers to a ratio of a quantity of fuel injected from in-cylinder injector 11 to the total fuel injection quantity, while injection ratio $\beta$ of intake port injector 12 refers to a ratio of a quantity of fuel injected from intake port injector 12 to the total fuel injection quantity, and $\alpha+\beta=100\%$. Thus, 100% direct injection means that the injection is only from in-cylinder injector 11, namely $\alpha=100\%$ and $\beta=0\%$. Meanwhile, 0% direct injection means that the injection is only from intake port injector 12, namely $\beta=100\%$ and $\alpha=0\%$. Values of this injection ratio may be varied as appropriate, in accordance with the operation conditions required to engine 1 that is used.

Figure 10:
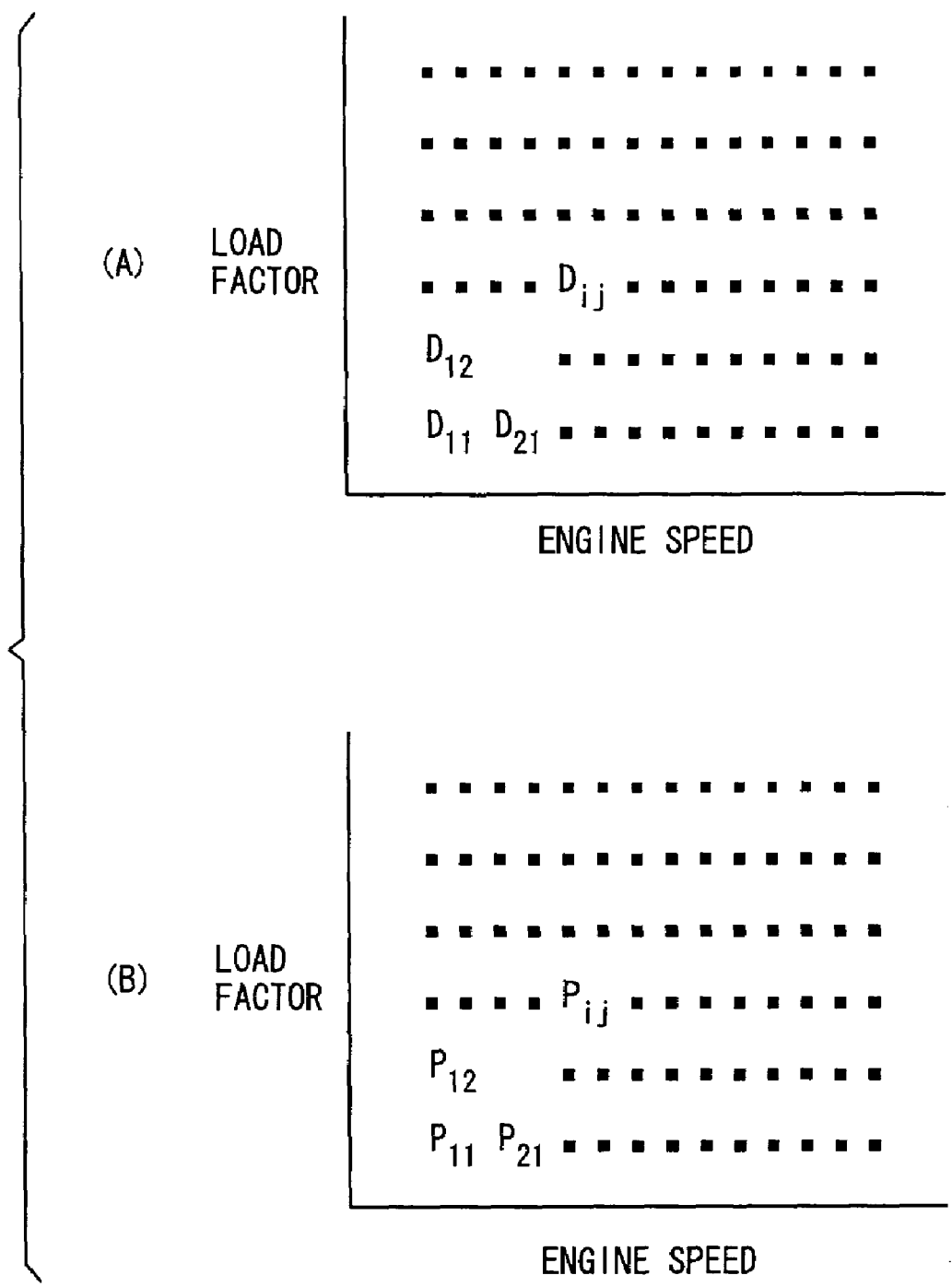
FIG. 10 shows an example of maps storing basic ignition timing values associated with an injection manner used in the embodiments of the present invention, basic map A associated with injection manner A of 100% direct injection is indicated at (A), and basic map B associated with injection manner B of 100% port injection is indicated at (B).

Regarding the ignition timing, it is supposed here that the manner of injection from in-cylinder injector 11 only, namely $\alpha=100\%$, is injection manner A and the manner of injection from intake port injector 12 only, namely $\beta=100\%$ and $\alpha=0\%$, is injection manner B. Then, proper ignition timing values associated with each of these injection manner A and injection manner B are stored as basic ignition timing values in basic map A and basic map B. Basic map A and basic map B are each a two-dimensional map with the vertical axis indicating the load factor and the horizontal axis indicating the engine speed as shown in FIG. 10 by (A) and (B), and the basic maps store basic ignition timing values each determined in advance in association with an operation state through experiments or the like. More specifically, basic map A stores the data of basic ignition timing value Dij for the 100% direct injection and basic map B stores the data of basic ignition timing value Pij for the 100% port injection. Here, basic ignition timing values Dij and Pij are each expressed by a crank angle (° CA) relative to the top dead center. When the injection from the in-cylinder injector and the injection from the intake port injector are performed simultaneously at a predetermined fuel injection ratio for operation, a proper ignition timing value (D+P)ij associated with fuel injection ratio $\alpha$ and/or $\beta$ in the current state of the operation is determined by interpolation of basic ignition timing values Dij and Pij that are set respectively in basic map A and basic map B discussed above.

"Proper ignition timing" herein refers to an ignition timing at which favorable ignition and combustion occurs when engine 1 is operated at a predetermined fuel injection ratio (including the case where $\alpha=0$ or $\beta=0$). The specific value of the ignition timing differs depending on an applied engine. To the proper ignition timing, various corrections may be made based on the coolant temperature and air/fuel ratio control for example of engine 1, which is well known, and accordingly the final ignition timing is set and ignition is caused to occur. As such corrections are well-known, a detailed description thereof will not be given here.

As seen from the above, as the injection ratio of in-cylinder injector 11 is indicated as $\alpha$, injection ratio $\beta$ of intake port cylinder 12 is $(100-\alpha)$. Therefore, the following description is given using only injection ratio $\alpha$ of in-cylinder injector 11.

First Embodiment

Electronic control unit 30 performs various control operations including fuel injection control and ignition timing control. Referring to the flowchart shown in FIG. 4, a routine of setting the injection ratio and the ignition timing is described according to a first embodiment of the present invention. The setting routine is carried out for example each time the crank angle advances by a predetermined angle.

In step S401 of the routine, as parameters representing an operation state of engine 1, the engine speed calculated from the measurement of engine speed sensor 46 and the engine load factor based on the degree of press-down of the accelerator detected by accelerator press-down degree sensor 44 are read.

Then, in step S402, it is determined whether a limit injection ratio holding flag "xhold" described hereinlater is on or off. When it is off namely the answer is "YES", the routine proceeds to step S403 to clear a limit injection ratio holding counter "choldtime". The steps subsequent to step S403 correspond to a first routine cycle after a request to change the injection ratio is made.

The routine then proceeds to step S404 in which a requested injection ratio α="kdualinj" is determined, based on the operation state parameters read in step S401, using the injection ratio map (see FIG. 3) that is stored in advance in a memory of electronic control unit 30. The routine further proceeds to step S405 in which a requested ignition timing value "absed" associated with the requested injection ratio α is nominally determined using basic maps A and B.

In step S406, the difference is determined by subtracting, from the requested ignition timing value "absed" determined nominally in step S405, a preceding ignition timing value "absedo" that is the ignition timing value before the change and, it is determined whether the difference exceeds a predetermined value "A" (for example, 10° CA). When the difference exceeds predetermined value "A", namely the answer is "YES", the routine proceeds to step S407 in which a new injection ratio α="kdualinj" is determined by subtracting a predetermined limit value "B" from a preceding injection ratio α="kdualinjo". In other words, the magnitude of change that is the difference between the preceding injection ratio and the requested injection ratio is limited by the limit value "B" and the new injection ratio thus limited is determined. The routine then proceeds to step S408 in which the above-described limit injection ratio holding flag "xhold" is set to on.

When the determination in step S406 is "NO", the routine proceeds to step S413 in which the difference is determined by subtracting, from preceding ignition timing value "absedo", the requested ignition timing value "absed" nominally determined in step S405 and, the determination is made as well as to whether the difference exceeds the predetermined value "A". When the difference exceeds the predetermined value "A", namely the answer is "YES", the routine proceeds to step S414 in which a new injection ratio α="kdualinj" is determined by adding a predetermined limit value "B" to the preceding injection ratio α="kdualinjo". In other words, the magnitude of change that is the difference between the preceding injection ratio and the requested injection ratio is limited by the limit value "B" and the new injection ratio thus limited is determined. The routine then proceeds to step S415 in which the above-described limit injection ratio holding flag "xhold" indicating that limitation is imposed is set to on.

After step S408 and step S415, the routine proceeds to step S409 in which a new ignition timing value "absed" associated with the new injection ratio α="kdualinj" determined in step S407 and step S414 is determined and then the routine is ended. When the determination in step S413 described above is "NO", namely when the difference does not exceed the predetermined value "A", the routine directly proceeds to step S409. In this case, however, the ignition timing value "absed" associated with the requested injection ratio α that is determined in step S405 described above is used as it is and the routine is ended.

In step S402 described above, when the aforementioned limit injection ratio holding flag "xhold" is on, namely the answer is "NO", the routine proceeds to step S410 in which limit injection ratio holding counter "choldtime" is incremented. Then, the routine proceeds to step S41 in which it is determined whether a count value of limit injection ratio holding counter "choldtime" exceeds a predetermined set value "M". The limit injection ratio holding counter "choldtime" is used for allowing, when the injection ratio is changed as described above, the operation to be carried out at the limited injection ratio and its associated ignition timing in at least a predetermined period of time after the change. As the set value "M", a predetermined period corresponding to any number of times between ten and twenty the ignition occurs or a period of elapsed time may be used.

When it is determined in step S411 that the count value does not exceed the predetermined set value "M", the routine proceeds to step S416 in which the preceding injection ratio α="kdualinjo" is used as it is as a new injection ratio α="kdualinj" and the routine proceeds to step S409 discussed above. In this step S409, as described above, a new ignition timing value "absed" associated with this new injection ratio α="kdualinj" is determined. In other word, without substantial change, the routine is ended. In step S411, however, when it is determined that the count value exceeds the predetermined set value "M", the routine proceeds to step S412 in which limit injection ratio holding flag "xhold" is cleared and proceeds to the step S404 and the following steps described above.

Figure 4:
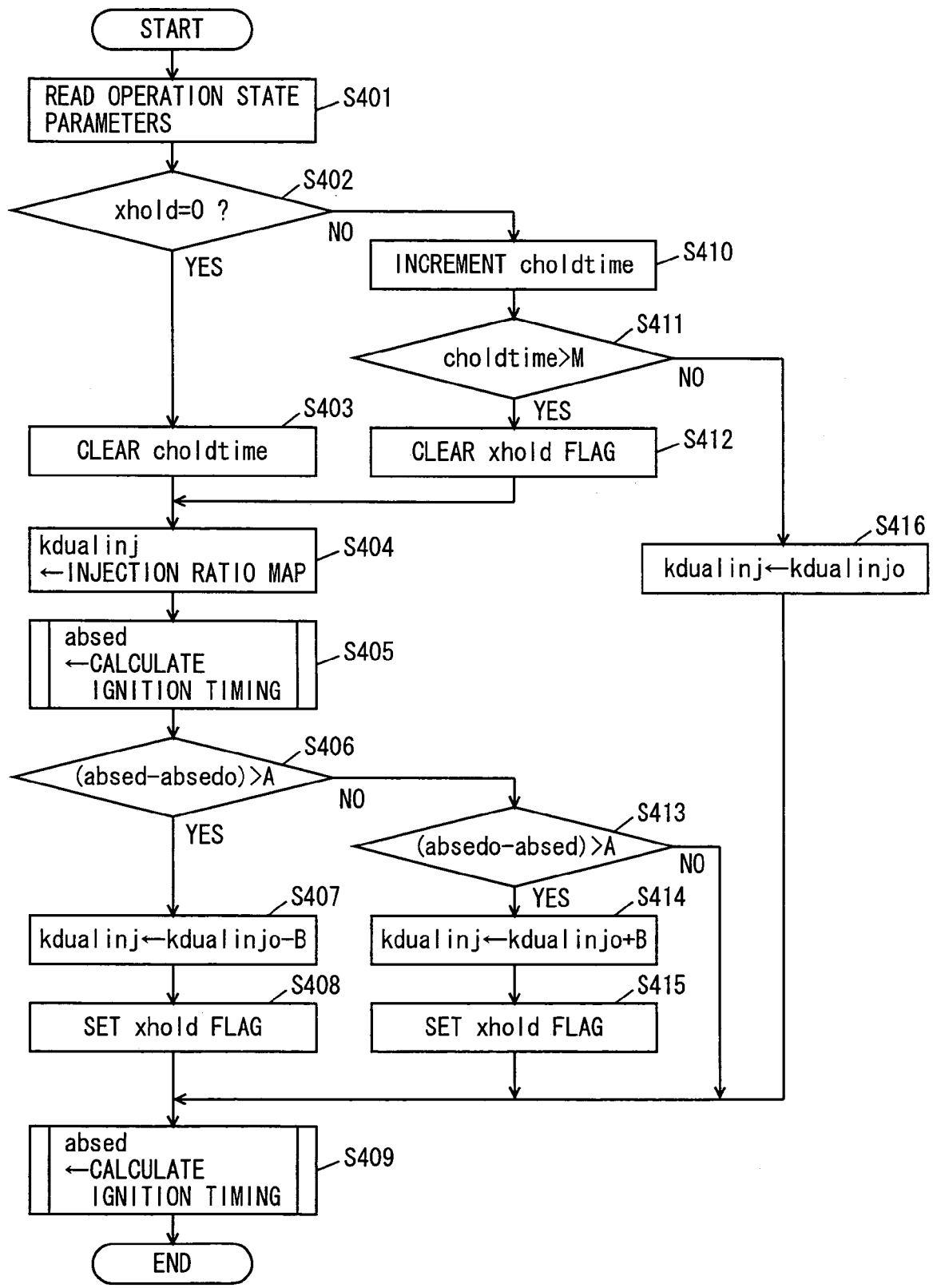
FIG. 4 is a flowchart showing an exemplary ignition timing control routine according to a first embodiment of the present invention.

For facilitating understanding of the first embodiment according to the control routine shown in the flowchart in FIG. 4 as discussed above, it is described with reference to the timing chart in FIG. 5 how the ignition timing is changed under control thereof as the injection manner is changed according to a change in operation state of engine 1.

FIG. 5 shows at (A) an example of the case where a request is made at time t0 to change for example injection ratio 0% (100% port injection) to injection ratio 100% (100% direct injection). FIG. 5 also shows at (B) an example of the case where a request is made as well at time t0 to change for example injection ratio 100% (100% direct injection) to injection ratio 0% (100% port injection).

As shown at (A) of FIG. 5, when a request is made at time t0 to change fuel injection ratio α from 0% to 100% (indicated by the chain line) for example and the difference between a proper ignition timing value SAp before the change and a proper ignition timing value SAd after the change exceeds a predetermined value "A" (10° CA for example), a new injection ratio "α=0+B" is determined by adding a predetermined limit value "B" to the preceding injection ratio α=0% and, a proper ignition timing value SAn associated with this new injection ratio "α=0+B" is determined and the determined ignition timing is set as the final ignition timing value in a predetermined period of time (t0–t1). After the predetermined period of time (t0–t1), the proper ignition timing value SAd associated with the requested injection ratio α of 100% is used.

Further, as shown at (B) of FIG. 5, when a request is made at time t0 to change fuel injection ratio α from 100% to 0% for example and the difference between a proper ignition timing value SAd before the change and a proper ignition timing value SAp after the change exceeds a predetermined value "A" (10° CA for example), a new injection ratio "α=100−B" is determined by subtracting a predetermined limit value "B" from the preceding injection ratio α=100% and, a proper ignition timing value SAn associated with the new injection ratio "α=100−B" is selected and set as the final ignition timing value in a predetermined period of time (t0–t2).

Such a request to change fuel injection ratio α from 100% to 0% for example is made when, for example, the operation state is changed for example from the stratified lean region "1" to the homogeneous lean region "2" or from a high-load region to a low-load region in the homogeneous lean region "2". In this case, due to the fact that a part of the fuel injected from intake port injector 12 that sticks to the port tends to be supplied with some delay to combustion chamber 64, the air/fuel ratio is likely to become lean to a greater degree as compared with a target air/fuel ratio. Therefore, if the injection ratio as requested and its associated ignition timing are implemented as they are, the torque could decrease to a great extent. In the present embodiment, however, the magnitude of change of the injection ratio is limited and the ratio is changed step-by-step, the output power does not excessively change and the torque shock can be prevented.

The request to change the fuel injection ratio from 0% to 100% is made in the case opposite to the above-described one. In this case, due to the fact that the fuel sticking to the port is supplied to combustion chamber 64 in addition to the fuel injected into the cylinder, the air/fuel ratio is likely to become rich to a greater degree as compared with a target air/fuel ratio. Therefore, if the injection ratio as requested and the associated ignition timing are implemented as they are, the advance is excessive to cause transitional knock. In the present embodiment, however, since the magnitude of change of the injection ratio is limited and the change is made step-by-step, occurrence of such transitional knock can be prevented.

Second Embodiment

Figure 6:
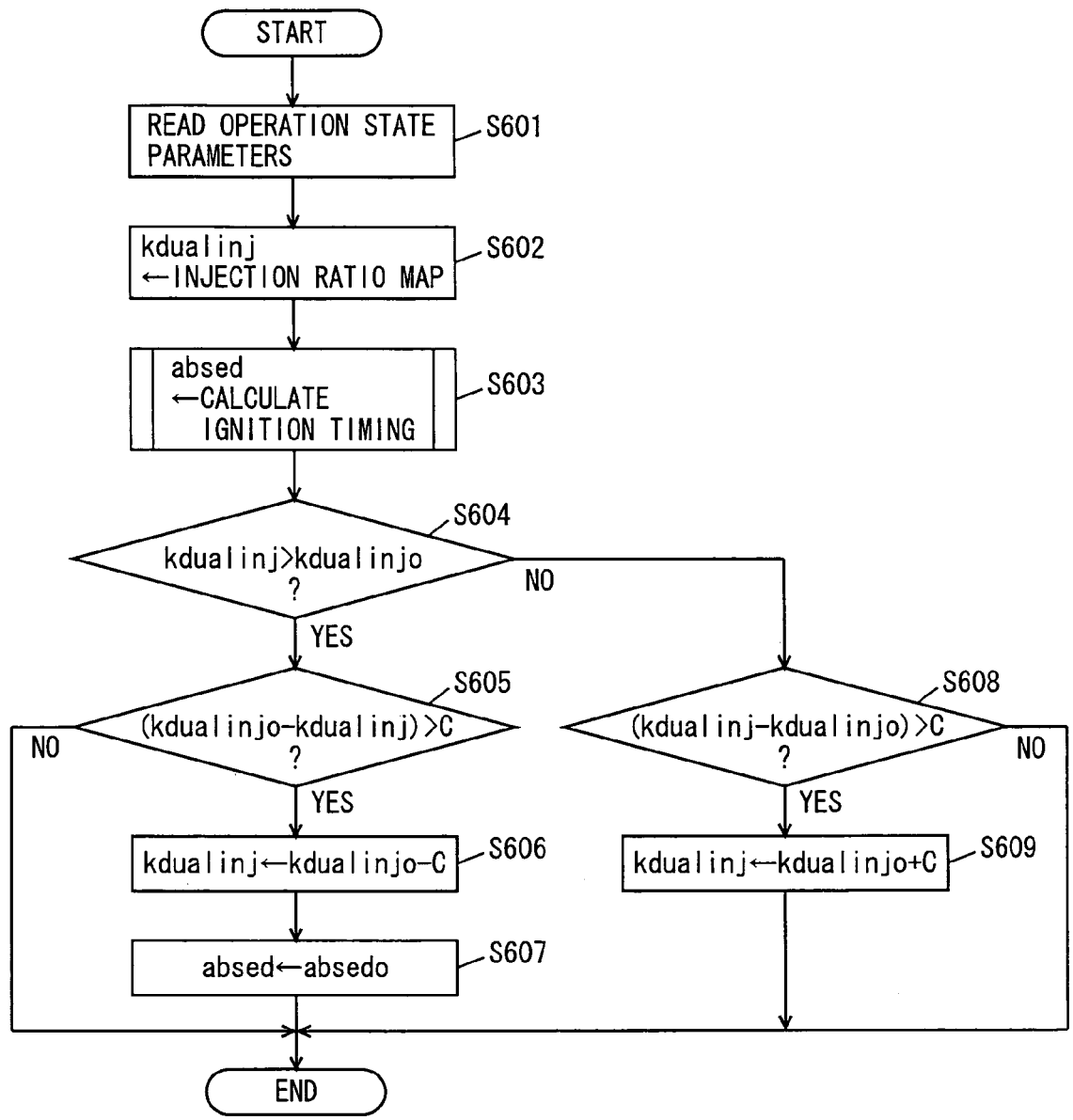
FIG. 6 is a flowchart showing an exemplary ignition timing control routine according to a second embodiment of the present invention.

Referring to the flowchart shown in FIG. 6, a routine of setting the injection ratio and the ignition timing is described according to a second embodiment of the present invention. The setting routine is also carried out for example each time the crank angle advances by a predetermined angle.

In step S601 of the routine, as in the preceding embodiment, as parameters representing an operation state of engine 1, the engine speed calculated from the measurement of engine speed sensor 46 and the engine load factor based on the degree of press-down of the accelerator detected by accelerator press-down degree sensor 44 are read.

Then, in step S602, based on the operation state parameters read in step S601, a requested injection ratio α="kdualinj" is determined using the injection ratio map stored in advance in a memory of electronic control unit 30.

The routine then proceeds to step S603 in which a requested ignition timing value "absed" associated with the requested injection ratio α is nominally determined. Then, in step S604, a comparison is made between the requested injection ratio α="kdualinj" determined in step S602 and a preceding injection ratio α="kdualinjo" and, when the preceding injection ratio is larger than the requested injection ratio, the routine proceeds to step S605. On the contrary, when the requested injection ratio is larger than the preceding injection ratio, the routine proceeds to step S608.

In step S605, the difference is determined by subtracting, from the preceding injection ratio α "kdualinjo", the requested injection ratio α "kdualinj" and, it is determined whether the difference exceeds a predetermined value "C". When the difference exceeds the predetermined value "C", namely the answer is "YES", the routine proceeds to step S606 in which a new injection ratio α "kdualinj" is determined by subtracting the predetermined value "C" serving as a limit value from the preceding injection ratio α "kdualinjo". The routine then proceeds to step S607 in which the preceding ignition timing value is defined as a new ignition timing value. In contrast, when it is determined in step S605 that the above-described difference does not exceed the predetermined value "C" or does not exceed the predetermined value any more, the routine is ended. In this case, the requested ignition timing value "absed" determined in step S603 is used as it is and the routine is ended.

In step S608 to which the routine proceeds when the requested injection ratio is larger than the preceding injection ratio, the difference is determined by subtracting, from the requested injection ratio α="kdualinj", the preceding injection ratio α "kdualinjo" and, it is determined whether the difference exceeds a predetermined value "C". When the difference exceeds the predetermined value "C", namely the answer is YES, the routine proceeds to step S609 in which a new injection ratio α "kdualinj" is determined by adding the predetermined value "C" serving as a limit value to the preceding injection ratio and the routine is ended. In step S608, when the difference described above does not exceed the predetermined value "C" or does not exceed the predetermined value any more, the routine is ended. In these cases, the requested ignition timing value "absed" determined in step S603 is used as it is and the routine is ended.

For facilitating understanding of the second embodiment according to the control routine shown in the flowchart in FIG. 6 as discussed above, it is described with reference to the timing chart in FIG. 7 how the ignition timing is changed under control thereof as the injection manner is changed according to a change in operation state of engine 1.

FIG. 7 shows at (A) an example of the case where a request is made at time t0 to change the injection ratio, for example, from αs to αb (αb>αs). FIG. 7 also shows at (B) an example of the case where a request is made as well at time t0 to change the injection ratio, for example, from αb to αs.

When the request is made at time t0 to change the smaller injection ratio αs to the larger injection ratio αb and the difference between the injection ratio before the change and the injection ratio after the change exceeds a predetermined value "C" (5% for example), a proper ignition timing value SAd associated with the requested injection ratio αb is on the retard side relative to the preceding proper ignition timing value. Then, the ignition timing is immediately switched or changed, prior to a step-by-step change of the fuel injection ratio. As to the injection ratio, in the period until the time when the magnitude of change of the injection ratio is smaller than the predetermined value "C" (period t0–t3), the step-by-step change of the injection ratio is made by increasing the injection ratio by the predetermined value "C" per step to allow the injection ratio to reach the requested injection ratio αb.

When the request is made at time t0 to change the larger injection ratio αb to the smaller injection ratio αs and the difference between the injection ratio before the change and the one after the change exceeds a predetermined value "C", a proper ignition timing value SAp associated with the requested injection ratio αs is on the advance side relative to the preceding one. Then, the ignition timing is switched with a delay relative to a step-by-step change of the fuel injection ratio. Specifically, in the period until the time when the magnitude of change of the injection ratio is smaller than the predetermined value "C" (period t0–t4), the step-by-step change of the injection ratio is made by decreasing the injection ratio by the predetermined value "C" per step to allow the injection ratio to reach the requested injection ratio αs. The ignition timing is thereafter changed to the ignition timing SAp associated with the requested injection ratio αs.

As mentioned above, a change in injection ratio is likely to cause temporary over-rich and over-lean with respect to a target air/fuel ratio. Therefore, if an injection ratio that as requested and its associated requested ignition timing are implemented as they are, transitional knock and a considerable decrease in torque could occur. In contrast, according to the present embodiment, the fuel injection ratio is changed step-by-step until the injection ratio reaches the requested injection ratio and the time when the ignition timing is changed is made different with respect to the step-by-step change of the fuel injection ratio. The ignition timing is changed prior to the step-by-step change of the fuel injection ratio when the ignition timing is to be changed to the one on the retard side. When the ignition timing is to be changed to the one on the advance side, the timing at which the ignition timing is changed is delayed relative to the step-by-step change of the fuel injection ratio. Thus, the ignition timing can always be set to an ignition timing on the retard side relative to a proper ignition timing associated with each injection ratio and accordingly, transitional knock can surely be suppressed.

Third Embodiment

Figure 8:
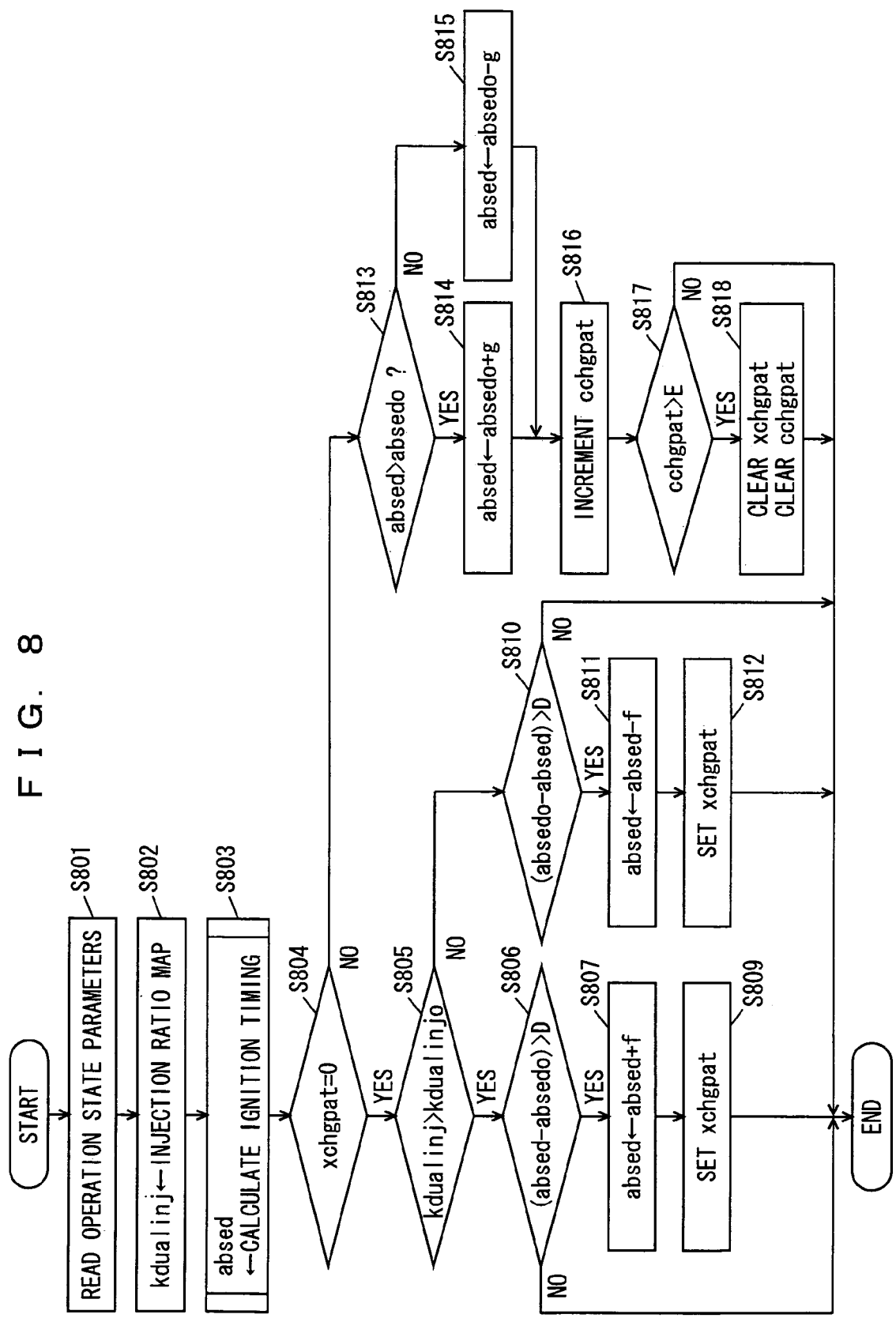
FIG. 8 is a flowchart showing an exemplary ignition timing control routine according to a third embodiment of the present invention.

Referring to the flowchart shown in FIG. 8, a routine of setting the injection ratio and the ignition timing is described according to a third embodiment of the present invention. The setting routine is carried out for example each time the crank angle advances by a predetermined angle.

In step S801 of the routine, as parameters representing an operation state of engine 1, the engine speed calculated from the measurement of engine speed sensor 46 and the engine load factor based on the degree of press-down of the accelerator detected by accelerator press-down degree sensor 44 are read.

Then, in step S802, based on the operation state parameters read in step S801, a requested injection ratio α="kdualinj" is determined using the injection ratio map stored in advance in a memory of electronic control unit 30. The routine then proceeds to step S803 in which a requested ignition timing value "absed" associated with the requested injection ratio α is nominally determined.

Then, in step S804, it is determined whether an injection manner switching flag "xchgpat" that is described hereinlater is on or off When it is off, namely the answer is "YES", the routine proceeds to step S805. When it is on, namely the answer is "NO", the routine proceeds to step S813 described hereinlater. It is noted that the steps following this step S805 correspond to a first routine cycle after the request to change the injection ratio is made.

In step S805, a comparison is made between the requested injection ratio α="kdualinj" determined in step S802 and a preceding injection ratio α="kdualinjo" for determining which is larger/smaller. When the preceding injection ratio α "kdualinjo" is larger, namely the answer is "YES", the routine proceeds to step S806. On the contrary, when the preceding injection ratio is smaller, namely the answer is "NO", the routine proceeds to step S810.

In step S806, the difference is determined by subtracting, from the requested ignition timing value "absed" determined in step S803, the preceding ignition timing value "absedo" and then it is determined whether the determined difference exceeds a predetermined value "D" (10° CA for example). When the difference exceeds the predetermined value "D", namely the answer is "YES", the routine proceeds to step S807 in which a new ignition timing value "absed" is determined by adding a predetermined value "f" to the requested ignition timing value "absed". In other words, the ignition timing is temporarily over-advanced by the predetermined value "f" relative to the requested ignition timing value.

In step S810, the difference is also determined by subtracting, from the preceding ignition timing value "absedo", the requested ignition timing value "absed" determined in step S803 and then it is determined whether the determined difference exceeds a predetermined value. "D". When the difference exceeds the predetermined value "D", namely the answer is "YES", the routine proceeds to step S811 in which a new ignition timing value "absed" is determined by subtracting a predetermined value "f" from the requested ignition timing value "absed". In other words, the ignition timing is temporarily over-retarded by the predetermined value "f" relative to the requested ignition timing value.

When the difference does not exceed the predetermined value "D" in step S806 and step S810 discussed above, the routine is ended. Further, after step S807 and step S811 discussed above, the routine proceeds to step S809 and step S812 respectively to set the aforementioned injection manner switching flag "xchgpat" indicating that the control to set this "over advance/over retard" is in process.

When the determination in step S804 is "NO", the routine proceeds to step S813 in which a comparison is made between the preceding ignition timing value "absedo" and the requested ignition timing value "absed" determined in step S803 and it is determined which is larger/smaller. When the requested ignition timing value "absed" is larger, namely the answer is "YES", the routine proceeds to step S814. On the contrary, when the requested ignition timing is smaller, namely the answer is NO", the routine proceeds to step S815. In step S814, a predetermined attenuation value "g" is added to the preceding ignition timing value "absedo". In step S815, the predetermined attenuation value "g" is subtracted from the preceding ignition timing value "absedo". These steps are each performed for changing the ignition timing step-by-step by the predetermined attenuation value "g" per step so that the ignition timing reaches the requested ignition timing value "absed" as discussed hereinlater.

Subsequent to step S814 and step S815, the routine proceeds to step S816 in which injection manner switching counter "cchgpat" is incremented and, in step S817, it is determined whether the count value exceeds a predetermined set value "E". This injection manner switching counter "cchgpat" is used, as described above, for an over-advance operation or an over-retard operation relative to the requested ignition timing value in at least a predetermined period of time after a change in injection ratio as discussed above. As the set value "E", a predetermined period of time corresponding to any number of times between ten and twenty the ignition occurs or a period of elapsed time may be used. The predetermined period of time may be the one until the difference between the preceding ignition timing value "absedo" and the requested ignition timing value "absed" becomes smaller than the predetermined attenuation value In step S817, when it is determined that the count value does not exceed the predetermined set value "E", the routine temporarily ended. However, when it is determined in step S817 that the count value exceeds the predetermined set value "E", the routine proceeds to step S818 to clear injection manner switching flag "xchgpat" and injection manner switching counter "cchgpat" and this injection manner switching routine is ended.

For facilitating understanding of the third embodiment discussed above, it is further described with reference to the timing chart in FIG. 9 how the ignition timing is changed under control thereof as the injection manner is changed according to a change in operation state of engine 1.

Figure 9:
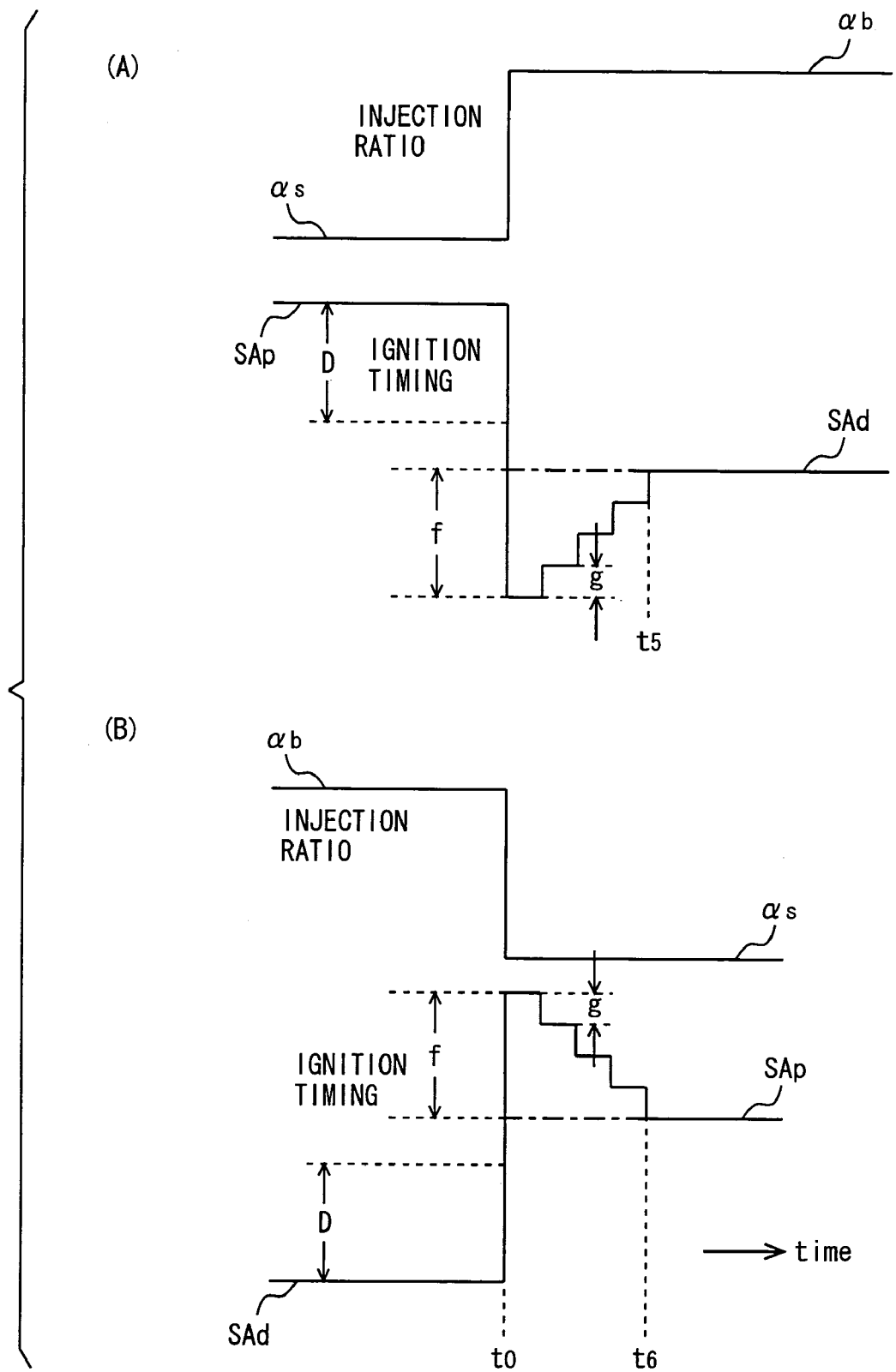
FIG. 9 is a timing chart showing how the ignition timing is changed under control of the ignition timing when the injection manner is changed, according to the third embodiment of the present invention.

FIG. 9 shows at (A) an example of the case where a request is made at time t0 to change the injection ratio for example from αs to αb (αb>αs). FIG. 9 also shows at (B) an example of the case where a request is made as well at time t0 to change the injection ratio for example from αb to αs.

As shown at (A) of FIG. 9, when a request is made at time t0 to change the smaller injection ratio αs to the larger injection ratio αb and the difference between an ignition timing value associated with the injection ratio before the change and an ignition timing value associated with the injection ratio after the change exceeds a predetermined value "D" (10° CA for example) and the proper ignition timing value SAd associated with the requested injection ratio αb is on the retard side relative to the preceding ignition timing value, the injection ratio is immediately switched or changed at time t0 from the smaller injection ratio αs to the larger injection ratio αb and, a new ignition timing is determined by decreasing the proper ignition timing value SAd by a predetermined value "f" and thus is temporarily over-retarded relative to the requested proper ignition timing value SAd. In a predetermined period of time (t0–t5), the over-retarded ignition timing is advanced step-by-step by a predetermined attenuation value "g" per step for allowing the ignition timing to reach the requested proper ignition timing value SAd.

Further, as shown at (B) of FIG. 9, when a request is made at time t0 to change the larger injection ratio αb to the smaller injection ratio αs, the difference between the ignition timing value associated with the injection ratio before the change and the ignition timing value associated with the injection ratio after the change exceeds a predetermined value "D" (10° CA for example), and the proper ignition timing value SAp associated with the requested injection ratio αs is on the advance side relative to the preceding one, the injection ratio is immediately switched or changed at time t0 from the larger injection ratio αb to the smaller injection ratio αs and a new ignition timing is determined by adding a predetermined value "f" to the proper ignition timing value SAp and is thus temporarily over-advanced relative to the requested proper ignition timing value SAp. In a predetermined period of time (t0–t6), the over-advanced ignition timing is retarded step-by-step by a predetermined attenuation value "g" per step for allowing the ignition timing to reach the requested proper ignition timing value SAp.

As discussed above, according to the third embodiment of the present invention, when a request to change the fuel injection ratio is made and the difference between the injection ratio before the change and the injection ratio after the change exceeds a predetermined value, the fuel injection ratio is immediately changed. Further, as the proper ignition timing associated with the fuel injection ratio after the change is on the retarded or advance side relative to the one before the change, the ignition timing is temporarily over-retarded or over-advanced and then changed step-by-step to reach the proper ignition timing associated with the fuel injection ratio after the change. Thus, transitional knock due to over-rich and decrease in torque due to over-lean relative to a target air/fuel ratio that is caused by the change of the injection ratio can be suppressed.

It is noted that, regarding the present invention, the manner of control for a pair of the case where the request is made to change the fuel injection ratio to a larger one and the case where the request is made to change the fuel injection ratio to a smaller one is not limited to the above-described embodiments. They may appropriately be combined. For example, for the case where the injection ratio is to be changed to increase, the control of the injection ratio and the ignition timing as shown at (A) of FIG. 5 may be performed and, for the case where the injection ration is to be changed to decrease, the control of the injection ratio and the ignition timing as shown at (B) of FIG. 9 may be performed. On the contrary, the control of the injection ratio and the ignition timing as shown at (B) of FIG. 5 and the one as shown at (A) of FIG. 9 may be combined.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An ignition timing control method for an internal combustion engine including an in-cylinder injector and an intake port injector, wherein when a request to change a fuel injection ratio to a requested fuel injection ratio is made and a difference between a proper ignition timing value corresponding to the fuel injection ratio before the change and a proper ignition timing value corresponding to the requested fuel injection ratio after the change exceeds a predetermined value, a magnitude of the change of the fuel injection ratio to the requested fuel injection ratio is limited and the ignition timing value is set to an ignition timing value corresponding to a fuel injection ratio changed by the limited magnitude of change.

2. An ignition timing control method for an internal combustion engine including an in-cylinder injector and an intake port injector, wherein when a request to change a fuel injection ratio to a requested fuel injection ratio is made and a difference between the fuel injection ratio before the change and the requested fuel injection ratio after the change exceeds a predetermined value, the fuel injection ratio is changed step-by-step for reaching the requested fuel injection ratio and, timing of change of an ignition timing is varied with respect to the step-by-step change of the fuel injection ratio.

3. The ignition timing control method for an internal combustion engine according to claim 2, wherein said timing of change of the ignition timing is prior to the step-by-step change of the fuel injection ratio when the ignition timing is changed to be retarded and, said timing of change of the ignition timing is delayed with respect to the step-by-step change of the fuel injection ratio when the ignition timing is changed to be advanced.

4. An ignition timing control method for an internal combustion engine including an in-cylinder injector and an intake port injector, wherein when a request to change a fuel injection ratio is made and a difference between the fuel injection ratio before the change and a fuel injection ratio after the change exceeds a predetermined value and a proper ignition timing corresponding to the fuel injection ratio after the change is a retarded ignition timing relative to an ignition timing corresponding to the fuel injection ratio before the change, the fuel injection ratio is changed and the ignition timing is temporarily over-retarded and thereafter changed step-by-step to reach the retarded ignition timing.

5. An ignition timing control method for an internal combustion engine including an in-cylinder injector and an intake port injector, wherein when a request to change a fuel injection ratio is made and a difference between the fuel injection ratio before the change and a fuel injection ratio after the change exceeds a predetermined value and a proper ignition timing corresponding to the fuel injection ratio after the change is an advanced ignition timing relative to an ignition timing corresponding to the fuel injection ratio before the change, the fuel injection ratio is changed and the ignition timing is temporarily over-advanced and thereafter changed step-by-step to reach the advanced ignition timing.

6. An ignition timing control apparatus for an internal combustion engine including an in-cylinder injector and an intake port injector, wherein when a request to change a fuel injection ratio to a requested fuel injection ratio is made and a difference between a proper ignition timing value corresponding to the fuel injection ratio before the change and a proper ignition timing value corresponding to the requested fuel injection ratio after the change exceeds a predetermined value, a magnitude of the change of the fuel injection ratio to the requested fuel injection ratio is limited and the ignition timing value is set to an ignition timing value corresponding to a fuel injection ratio changed by the limited magnitude of change.

7. An ignition timing control apparatus for an internal combustion engine including an in-cylinder injector and an intake port injector, wherein when a request to change a fuel injection ratio to a requested fuel injection ratio is made and a difference between the fuel injection ratio before the change and the requested fuel injection ratio after the change exceeds a predetermined value, the fuel injection ratio is changed step-by-step for reaching the requested fuel injection ratio and, timing of change of an ignition timing is varied with respect to the step-by-step change of the fuel injection ratio.

8. The ignition timing control apparatus for an internal combustion engine according to claim 7, wherein said timing of change of the ignition timing is prior to the step-by-step change of the fuel injection ratio when the ignition timing is changed to be retarded and, said timing of change of the ignition timing is delayed with respect to the step-by-step change of the fuel injection ratio when the ignition timing is changed to be advanced.

9. An ignition timing control apparatus for an internal combustion engine including an in-cylinder injector and an intake port injector, wherein when a request to change a fuel injection ratio is made and a difference between the fuel injection ratio before the change and a fuel injection ratio after the change exceeds a predetermined value and a proper ignition timing corresponding to the fuel injection ratio after the change is a retarded ignition timing relative to an ignition timing corresponding to the fuel injection ratio before the change, the fuel injection ratio is changed and the ignition timing is temporarily over-retarded and thereafter changed step-by-step to reach the retarded ignition timing.

10. An ignition timing control apparatus for an internal combustion engine including an in-cylinder injector and an intake port injector, wherein when a request to change a fuel injection ratio is made and a difference between the fuel injection ratio before the change and a fuel injection ratio after the change exceeds a predetermined value and a proper ignition timing corresponding to the fuel injection ratio after the change is an advanced ignition timing relative to an ignition timing corresponding to the fuel injection ratio before the change, the fuel injection ratio is changed and the ignition timing is temporarily over-advanced and thereafter changed step-by-step to reach the advanced ignition timing.

* * * * *